United States Patent [19]
Burch

[11] Patent Number: 5,319,989
[45] Date of Patent: Jun. 14, 1994

[54] GAS TURBINE STARTER INCORPORATING WEAR-RESISTANT SLIP CLUTCH

[75] Inventor: Darrel W. Burch, Phoenix, Ariz.

[73] Assignee: Allied-Signal Inc., Morris Township, Morris County, N.J.

[21] Appl. No.: 932,465

[22] Filed: Aug. 20, 1992

[51] Int. Cl.⁵ .................... F02N 15/02; F16H 35/10
[52] U.S. Cl. ...................... 74/7 E; 60/39.142; 123/179.31; 475/265
[58] Field of Search ...................... 74/7 C, 7 E; 123/179.31; 475/265; 60/39.142

[56] References Cited

U.S. PATENT DOCUMENTS

| | | | |
|---|---|---|---|
| 1,925,943 | 9/1933 | Stein | 475/265 X |
| 2,600,762 | 6/1952 | Hartz | 475/265 X |
| 2,625,047 | 1/1953 | Wood | 475/265 X |
| 2,918,227 | 12/1959 | Mauborgne | 475/265 X |
| 3,727,733 | 4/1973 | Mrazek | 74/7 C X |
| 3,915,034 | 10/1975 | Ward | 475/265 X |
| 4,253,557 | 3/1981 | Bunger | 192/54 |

*Primary Examiner*—Allan D. Herrmann
*Attorney, Agent, or Firm*—Joseph R. Black; Robert A. Walsh

[57] ABSTRACT

A gas-driven turbine starter (10) is provided with a slip clutch comprised of a radially inner portion (58,70) which is rotatable relative to the starter housing (14); and a radially outer portion (54,68) which is connected to the housing so as to be rotationally stationary relative thereto. This arrangement functionally separates the slip clutch from the power train, and provides for reduced wear of clutch discs.

5 Claims, 3 Drawing Sheets

GAS TURBINE STARTER INCORPORATING WEAR-RESISTANT SLIP CLUTCH

TECHNICAL FIELD

The present invention relates to turbine-type, gas-driven starters (as known as "gas turbine starters"; hereinafter, "GTS"). More particularly, the invention relates to that class of GTS which incorporates a slip clutch as a means for protecting internal components from impact torque.

BACKGROUND OF THE INVENTION

A GTS is typically used to start a gas turbine engine in aerospace applications. The design of the GTS is determined in substantial measure by the relationship between torque and engine speed during starting cycles.

A starting cycle may be initiated from a cold-start condition (i.e. the engine isn't running), or from a condition in which a running engagement is required. In the latter condition, there is an impact torque (also known as "shock" torque) associated with sudden torque-transmitting engagement between the GTS and the engine. In the former condition, there is an impact torque associated with every starting cycle if the arrangement is such that the output shaft of the GTS is not constantly engaged with the input shaft of the engine.

In addition, abnormality in the design of a particular engine may result in impact torques which are unassociated with starting cycles.

Theoretically, a GTS could be designed to accommodate all conditions of torque. However, the impact torque could then result in damage to the engine rather than the GTS. Accordingly, the engine manufacturer typically requires that the output shaft of the GTS be designed to shear at a particular level of torque deemed consonant with protection of the engine. That requirement, while effective in protecting the engine, results in numerous GTS failures and associated repair and replacement cost. From the perspective of the user of the engine, the expectation of such failure also increases inventory cost.

U.S. Pat. No. 4,253,557 (Bunger) discloses a variable load clutch apparatus aimed at compensating for impact torque in the above-described applications. The apparatus incorporates a slip clutch in the form of discs 8–22. Discs 8,10,12, and 14 are connected to rotate with a clutch member 24, while discs 16,18,20, and 22 are connected to rotate with a driving member 2. The discs are pre-loaded to a degree which ensures slippage at a predetermined torque load during an impact torque condition.

The use of a slip clutch such as that proposed by Bunger is sound in principle when applied to a GTS. However, if applied to a GTS in the manner illustrated in the '557 patent, the problem of damage from impact torque is apparently replaced with the problem of excessive clutch wear. The excessive wear results from two factors. First, because the starter output shaft is not constantly engaged with the engine input shaft, the clutch slips every time the engine is started, and can therefore be expected to wear more quickly than in an arrangement which incorporates constant engagement between the shafts. Second, the illustrated arrangement contemplates a relatively low clutch-disk radius. The surface area over which slippage occurs, or through which torque transmission is effected via friction, is therefore relatively low. Consequently, the friction associated with slippage is relatively high and can be expected to result in relatively accelerated wear.

An objective of the present invention is to provide a GTS with a more wear-resistant slip clutch.

A further objective is to provide a GTS with a slip clutch which is operative to slip during an impact torque condition attending a running engagement, thus minimizing failure of GTS output shafts.

SUMMARY OF THE INVENTION

This invention achieves the above-stated objectives by incorporating in a GTS a disc-type slip clutch comprised of a plurality of annular discs alternately mounted to a stationary portion of the GTS and to a normally stationary but conditionally rotatable portion of the GTS power train. The stationary portion may be the GTS housing or any suitably located structural portion of the GTS which is rigidly secured to the housing. In the preferred embodiment of the invention, as more particularly described below, the conditionally rotatable portion is a planetary gear carrier.

The slip clutch is employed in combination with a starter output shaft which is adapted to shear at a level of torque which is higher than that required for slippage of the clutch.

DESCRIPTION OF THE PREFERRED EMBODIMENT

Figure 1:
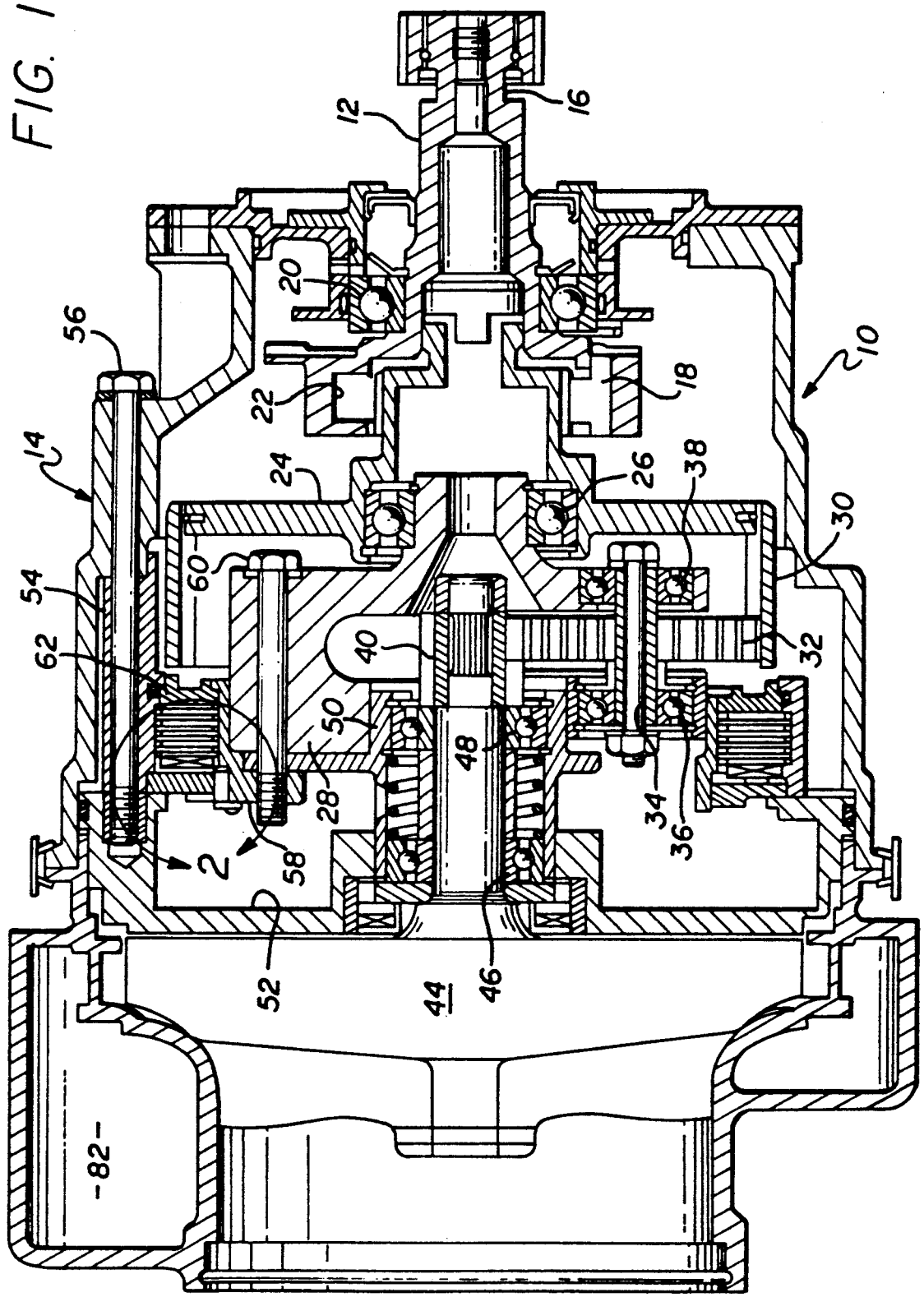
FIG. 1 is a diagrammatic representation of a gas turbine starter according to the preferred embodiment of the invention.

FIG. 1 illustrates an gas turbine starter 10 (hereinafter, "GTS") adapted by the provision of a projecting, splined output shaft 12 for constant engagement with the input shaft (not shown) of an engine-mounted gearbox. The output shaft 12 has a lower-diameter portion 16 adapted to shear in response to application of torque above a predetermined threshold. Such adaptation may take the form of selective dimensioning of the inner and outer diameters of the shaft 12 over a limited axial range, with due consideration of material properties. In addition, the output shaft 12 is adapted by conventional means to captively receive trunnions (not shown), whereby it supports rotational movement of three equiangularly spaced pawls 18. The shaft 12 is journalled in a bearing 20 secured to the housing 14.

The pawls 18 are spring-biased into engagement with a clutch jaw 22 formed on a hub gear 24. Thus, from a cold start, rotation of the hub gear 24 is transmitted to the output shaft 12 via a pawl and ratchet mechanism incorporated into the shaft and the hub gear. The pawls 18 are designed by conventional means to rotate out of engagement with the jaw 22 when the engine (not shown) reaches cutout speed.

The hub gear 24 captively retains a bearing 26 in which a planetary gear carrier 28 is journalled. In splined engagement with the hub gear 24 is a ring gear 30, which in turn is in splined engagement with three equiangularly spaced planet gears (as at 32). The planet gears 32 rotate about the axes of planet shafts (as at 34).

The latter are jounalled at both ends in bearings 36,38 fixed in the carrier 28.

Each planet gear 32 is engaged with a gear 40 rigidly fixed to a turbine rotor 44. The rotor 44 is journalled in bearings 46,48 which are captured between the rotor and a bearing carrier 50. The bearing carrier 50 extends into and is radially retained by carrier 28 and an end cap 52. A splined outer clutch housing 54 is rigidly fixed to the GTS housing 14 by a plurality of bolts (as at 56). A splined inner clutch housing 58, as well as the bearing carrier 50, are rigidly fixed to the gear carrier 28 by a plurality of bolts (as at 60). A backing ring 62 is retained in one axial direction by annular bosses formed on the inner and outer clutch housings 58,54. The inner surface of the outer clutch housing 54 is splined (as at 64), as is the outer surface (as at 66) of the inner clutch housing 58.

Each of a first set of spaced annular discs (as at 68) has a splined, radially outer surface, and is in splined engagement with the outer clutch housing 54. Thus, the discs 68 are in fixed rotational position relative to the GTS housing 14.

Figure 2:
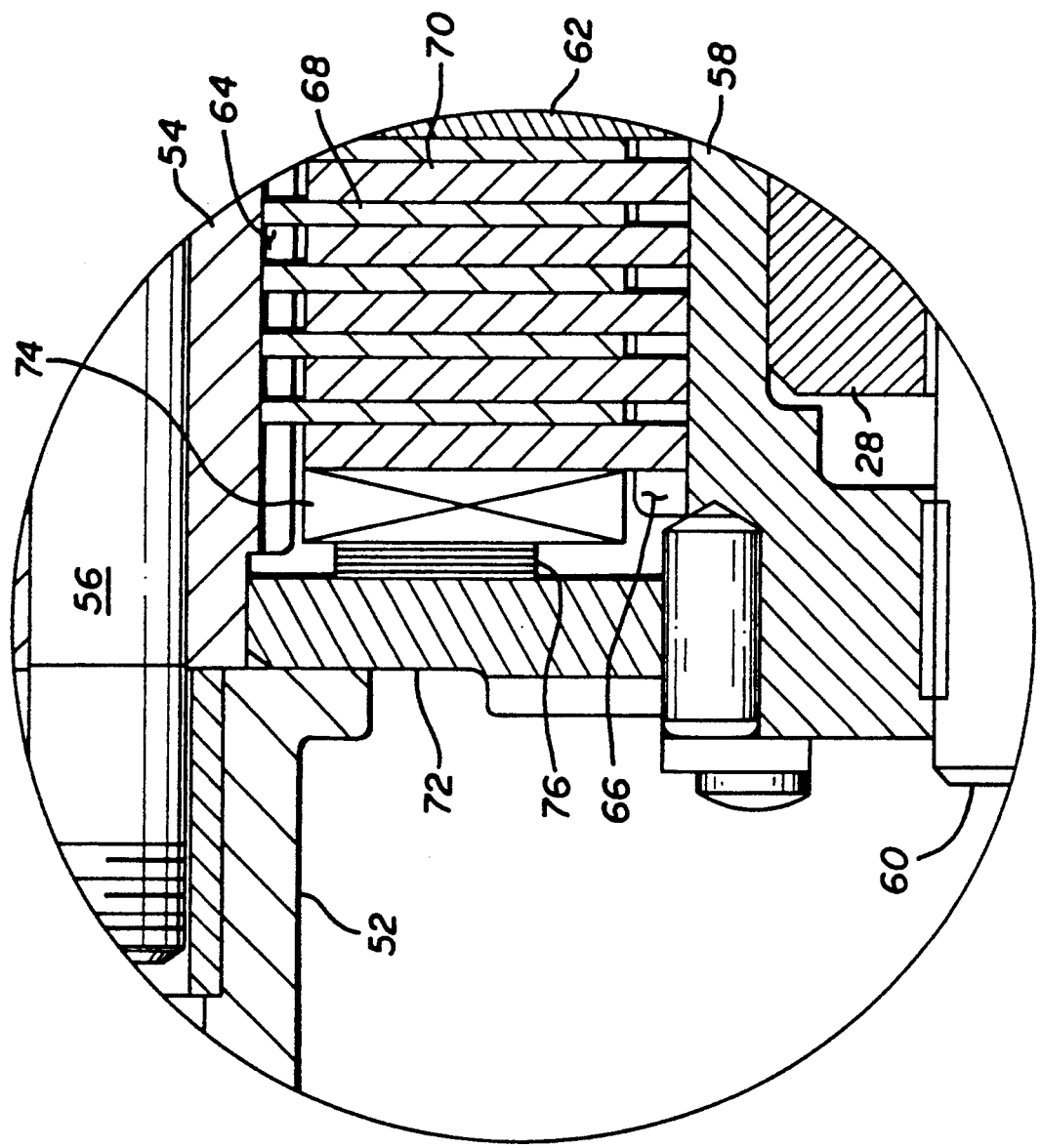
FIG. 2 is an enlarged view of the area indicated by the numeral 2 in FIG. 1.

Each of a second set of spaced annular discs (as at 70) has a splined, radially inner surface, and is in splined engagement with the inner clutch housing 58. Thus, the discs 70 of the second set are in fixed rotational position relative to the gear carrier 28. As indicated in FIG. 2, the discs of the first and second set are positioned in interleaved relation, and are pressed between the backing ring 62 and an adjustable clutch nut 72. The nut 72 is threadedly engaged with the inner clutch housing 58. Compressed between the nut 72 and the discs 68,70 is an annular wavespring 74. Shims 76 are used to fix the desired axial location of the nut 72.

Figure 3A:
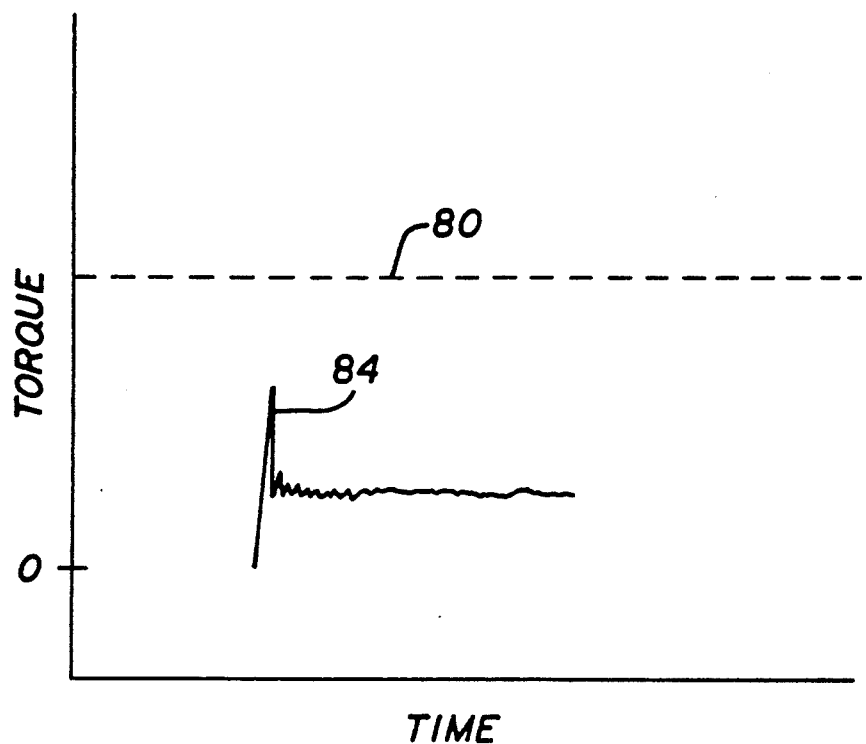
FIGS. 3a and 3b are graphs employed to said description of one of the advantages of the invention.
Figure 3B:
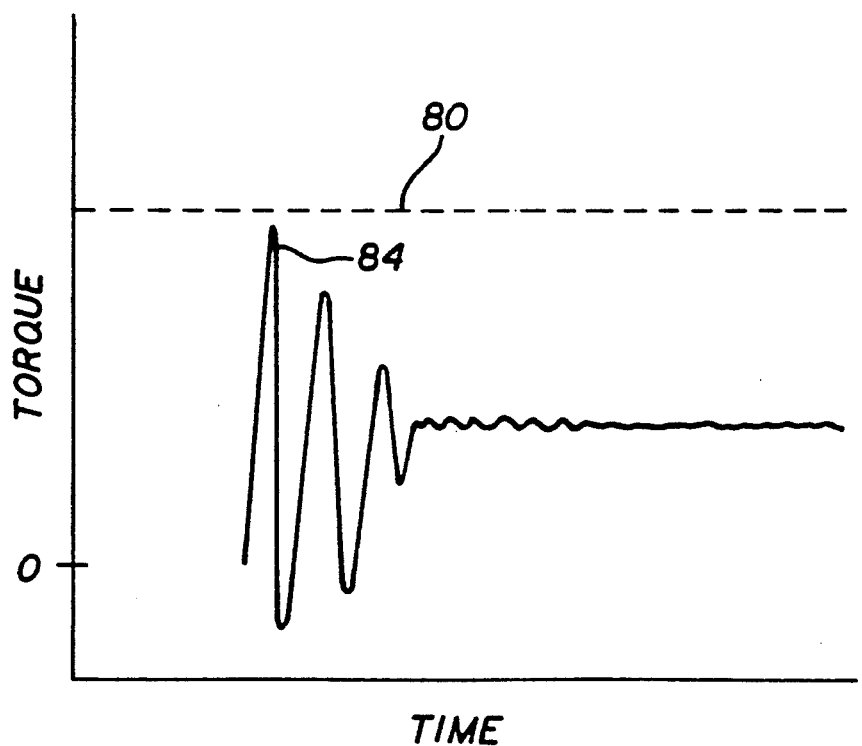

In FIGS. 3(a) and 3(b), line 80 represents the level of torque at which the output shaft 12 is designed to shear.

FIG. 3(b) illustrates a typical torque curve associated with a GTS, for a starting cycle initiated in running engagement. It should be understood that the magnitude of the torque will vary with a number of factors including the engine speed at which the running engagement is initiated, the mass flow of air delivered to the inlet (as at 82) of the GTS, moments of inertia, backlash, and system spring rate.

FIG. 3(a) illustrates a torque curve as in FIG. 3(b), but modified by use of the invention under conditions otherwise identical to those exemplified by FIG. 3(b). It will be noted that both the magnitude of the impact torque 84 and the duration of torque oscillation are significantly reduced by use of the invention.

Returning to FIGS. 1 and 2, it will also be noted that by fixing the first set of discs to the GTS housing 14, the radial dimensions of the discs 68,70 are maximized. As is explained above, this serves to reduce wear of the discs. Moreover, by providing a GTS design which incorporates an axially stationary output shaft 12 adapted for constant engagement with the engine, in combination with a clutch disc arrangement of maximal radial dimension, the invention provide a substantial reduction in the rate at which the discs are worn.

The foregoing portion of the description, which includes the accompanying drawings, is intended to serve a pedagogical purpose, and is not intended to restrict the scope of the invention more than is indicated by the teaching contained herein.

I claim:

1. A gas turbine starter comprising in combination:
   a housing;
   a turbine rotor including a rotor shaft, the rotor being secured in the housing for rotational movement;
   a circumferentially spaced plurality of gears captured by a circumferentially extending gear carrier disposed in the housing; the gears being engaged with the rotor shaft to receive torque therefrom; the carrier being secured to the housing so as to be rotatable relative thereto;
   an output shaft projecting from the housing and mounted thereon for rotational movement; the output shaft being adapted to shear when subjected to a predetermined level of torque;
   transmitting means disposed in the housing for transmitting torque from the output shaft to the gear carrier;
   a first plurality of spaced annular discs disposed in the housing and secured thereto so as to be in fixed rotational position relative to the housing;
   a second plurality of spaced annular discs disposed in the housing and secured to the carrier so as to be in fixed rotational position relative to the carrier; the discs of the first and second plurality being positioned in interleaved relation;
   exerting means for exerting a compressive force on the discs in a direction parallel to the longitudinal axis, whereby static friction between the discs inhibits rotational movement of the carrier relative to the housing; the compressive force being set such that the static friction is overcome and the rotational movement occurs in response to application of torque about the longitudinal axis of the output shaft at a level of torque which is lower than the predetermined level.

2. The starter of claim 1 wherein the transmitting means comprises a clutch.

3. The starter of claim 2 wherein the transmitting means comprises a pawl and ratchet clutch.

4. The starter of claim 2 wherein the exerting means comprises:
   a nut threadedly engaged with the carrier, and;
   an annular spring interposed between the nut and the discs.

5. The starter of claim 4 wherein the exerting means further comprises:
   a radially outer clutch member rigidly fixed to the housing; and
   a radially inner clutch member rigidly fixed to the carrier;
   the first plurality of discs being connected to the outer clutch member, and the second plurality of discs being connected to the inner clutch member.

* * * * *